United States Patent Office 3,499,859
Patented Mar. 10, 1970

3,499,859
STABLE THERMALLY CONDUCTIVE ROOM TEMPERATURE VULCANIZABLE SILICONE RUBBER
James E. Matherly, Elizabethtown, Ky., assignor to Dow Corning Corporation, Midland, Mich., a corporation of Michigan
No Drawing. Filed July 5, 1968, Ser. No. 742,491
Int. Cl. C08g 47/06, 51/04
U.S. Cl. 260—37                                21 Claims

ABSTRACT OF THE DISCLOSURE

A stable thermally conductive room temperature vulcanizable silicone rubber composition containing boron nitride is disclosed. The composition is prepared from a hydrocarbonoxy endblocked diorganopolysiloxane, boron nitride and a curing catalyst. This composition is useful as an insulation for conducting heat away from an insulated body.

---

The present invention relates to a stable thermally conductive room temperature vulcanizable silicone rubber containing boron nitride.

Room temperature vulcanizable silicone rubbers are well known and find many uses in caulking, sealing, insulating and the like. In certain electrical insulating uses, the electrical component generates enough heat to cause a change in the resistance of the electrical component. Often when such resistance changes, the electrical circuit will function in an abnormal manner and will not serve its designed purpose. Since room temperature vulcanizable silicone rubber is conveniently used in insulating electrical components because of its electrical properties and ease of handling, and since it also insulates the electrical component so that the heat generated does not dissipate, another insulating material which insulates as well as dissipates the generated heat from the electrical component is sought. Some methods of conducting heat have been suggested, such as filling a silicone rubber with powdered metal such as copper. However, a copper filled silicone rubber also conducts electricity and would not be a satisfactory insulation. It is known that boron nitride is a thermally conductive material as well as an electrical insulating material. It is therefore desirable to use such a material to insulate electrical components and at the same time permit any heat generated by the electrical components to be conducted away from the electrical component by the insulating material. It is also known that boron nitride can be used in certain silicone resins and oils, however, it was believed that boron nitride could not be used in room temperature vulcanizable silicone rubber since a mixture of the silicone polymer used in preparing the room temperature vulcanizable silicone rubber and boron nitride would gel before it could be used. Unexpectedly, a stable thermally conductive room temperature vulcanizable silicone rubber has now been made.

It is therefore an object of the present invention to provide a stable thermally conductive room temperature vulcanizable silicone rubber containing boron nitride. This and other objects will become apparent to those skilled in the silicone rubber art from the following detailed description of the present invention.

The present invention relates to a stable thermally conductive room temperature vulcanizable silicone rubber consisting essentially of (A) 100 parts by weight of an organo-polysiloxane of the formula

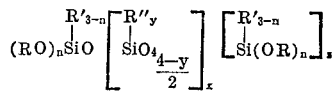

in which R is a monovalent aliphatic hydrocarbon radical or a monovalent halogenated aliphatic hydrocarbon radical of from 1 to 8 inclusive carbon atoms, each R' and R" is selected from the group consisting of monovalent hydrocarbon radicals, monovalent halogenated hydrocarbon radicals and cyanoalkyl radicals, all of from 1 to 18 inclusive carbon atoms, $n$ has an average value of from 2 to 3 inclusive, $y$ has an average value of from 1.99 to 2 inclusive, $z$ has an average value of from 1 to 1.01, the sum of $y+z$ is 3 and $x$ has an average value of from 7 to 1250, (B) from 110 to 175 parts by weight of finely divided boron nitride, and (C) a curing catalyst for the organopolysiloxane (A).

The organopolysiloxanes (A) are well known in the art and are described in detail in U.S. Letters Patent No. 3,161,614. The methods of preparation of the organopolysiloxanes (A) are also described in U.S. Letters Patent No. 3,161,614.

The organopolysiloxanes (A) can be both linear and branched in structure and can be characterized by the formula

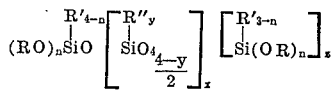

in which $n$ has an average value from 2 to 3 inclusive, $y$ has an average value from 1.99 to 2 inclusive, $z$ has an average value from 1 to 1.01 inclusive and the sum of $y+z$ is 3. These organopolysiloxanes can range from low viscosity fluids in which $x$ has a value of 7 up to fluids in which $x$ has a value of 1,250. When maximum stress strain properties are desired, $x$ should have a value of 100 or more. However, when fluid coating compositions are desired, it is often desirable that $x$ have a value from 7 to 100. If $x$ is below 7, the condensates form a high amount of cyclic material and is hence undesirable for curing compositions.

For the purpose of this invention, R can be any aliphatic radical of from 1 to 8, preferably 1 to 3 inclusive carbon atoms such as methyl, ethyl, propyl, isopropyl, allyl, butyl, 2-ethylbutyl and octyl. R can also be any haloaliphatic radical of 1 to 8 carbon atoms in which there is no halogen alpha to the silicon-bonded oxygen. Specific examples of such radicals are β-chloroethyl, β-bromopropyl 2,2,2-trifluoroethyl, 3,3,3,2,2-pentafluoropropyl, —(CH$_2$)$_4$C$_2$F$_5$, gamma-iodopropyl, β-chlorooctyl, β-chloroisopropyl, omega-chlorooctyl and 3-chloro-2-ethylhexyl.

R' and R" can be any monovalent hydrocarbon radical such as alkyl radicals such as methyl, ethyl, isopropyl, hexyl or octadecyl; any alkenyl radical such as vinyl, hexenyl; any cycloaliphatic radical such as cyclohexyl, cyclopentyl, cyclohexenyl; any alkaryl radical such as benzyl, β-phenylethyl, β-phenylpropyl and any aromatic hydrocarbon radical such as phenyl, xenyl, tolyl, naphthyl, or xylyl.

Both R' and R" can also be any halogenated monovalent hydrocarbon radical such as gamma-chloropropyl, perfluorovinyl, 3,3,3-trifluoropropyl, chlorophenyl, tetrabromophenyl, chloroxenyl, chlorocyclohexyl and α,α,α- trifluorotolyl. In addition R' and R" can both be any cyanoalkyl radical such as β-cyanoethyl, gamma-cyanopropyl, omega-cyanobutyl, β-cyanobutyl and omega-cyanooctadecyl.

It should be understood that the various R' and R" groups in any one molecule can be the same or they can be different. Thus, the compositions can be homopolymers or copolymers. Furthermore, the compositions can be mixtures of different homopolymers and copolymers or mixtures of copolymers and homopolymers. Also in any composition the R groups can be the same or different.

The preferred organopolysiloxanes (A) are those in which R and R" are both methyl and $n$ is 3 and $x$ has an average value of from 100 to 500.

The finely divided boron nitride (B) is a commercially available material. Boron nitride can be obtained in a variety of particle sizes. The particle size is not critical as long as the particles are not so large as to be difficult to mix with the organopolysiloxane (A) to form a homogeneous mixture. The amount of boron nitride of this invention ranges from 110 to 175 parts per 100 parts of organopolysiloxane (A), preferably from 125 to 150 parts of boron nitride per 100 parts of organopolysiloxane (A). Compositions with less than 110 parts of boron nitride per 100 parts of organopolysiloxane (A) are not thermally conductive as defined by this invention.

The curing catalyst (C) for the present composition can be any curing catalyst which is known to cure the organopolysiloxanes of this invention. The amount of curing catalyst is not critical and is present in amounts sufficient to cure the organopolysiloxane (A). Amounts, for example, of from 0.1 to 10 weight percent catalyst based on the weight of the organopolysiloxane (A) can be used. Preferably, the amount of curing catalyst ranges from 0.1 to 2 weight percent based on the weight of the organopolysiloxane (A).

The compositions of this invention are stable in the absence of moisture whether catalyzed or not. The catalyst employed to cure the compositions of this invention can be any catalyst capable of causing the reaction of an alkoxysiloxane with water and of causing reaction between an SiOH group and a silicon-bonded alkoxy group. If desired, mutual solvents may be used to increase the solubility of the catalyst in the siloxane. One class of catalyst includes metal salts of monocarboxylic acids such as lead 2-ethyl octoate, dibutyl tin diacetate, dibutyl tin di-2-ethyl hexoate, dibutyl tin dilaurate, butyl tin tri-2-ethylhexoate, iron 2-ethyl hexoate, cobalt 2-ethyl hexoate, manganese 2-ethyl hexoate, zinc 2-ethyl hexoate, stannous octoate, tin naphthenate, zirconium octoate, antimony octoate, bismuth naphthenate, tin oleate, tin butyrate, zinc naphthenate, zinc stearate and titanium naphthenate.

Another class of catalyst are titanium esters such as tetrabutyltitanate, tetra-2-ethylhexyltitanate, tetraphenyltitanate, tetraoctadecyltitanate, triethanolaminetitanate, and octyleneglycotitanate.

Organosiloxytitanium compounds in which the organosiloxy radical is attached to the titanium atom through Si—O—Ti linkages can also be employed in this invention as catalyst. Each organic radical in the organosiloxy radical can be either a monovalent hydrocarbon or monovalent halohydrocarbon radical. Suitable examples of such radicals have been set forth above for R". Any valences of the titanium atom in the organosiloxytitanium compound which are not satisfied by organosiloxy radicals are satisfied by organic radicals which are attached to the titanium atom through Ti—O—C linkages, hydroxyl radicals and oxygen atoms of a Ti—O—Ti linkage. Thus, the two main classes of organosiloxytitanium compounds which fall within the above definition are those containing four organosiloxy radicals per titanium atom and those which contain from one to three organosiloxy radicals per titanium atom with the remaining valences of the titanium atom being satisfied by organic radicals, hydroxy radicals and oxygen atoms of Ti—O—Ti linkages. An example of the first class of organosiloxytitanium compound is

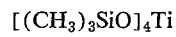

[(CH$_3$)$_3$SiO]$_4$Ti

In the second class of organosiloxytitanium compounds, the remaining valences of the titanium can be satisfied by organic radicals, e.g.

[(CH$_3$)$_3$SiO]$_2$Ti[OCH(CH$_3$)$_2$]$_2$ and

[(C$_6$H$_5$)$_3$SiO]Ti[OCH(CH$_3$)$_2$]$_3$ or hydroxyl radicals, e.g., [(CH$_3$)$_2$(C$_6$H$_5$)SiO]$_3$Ti(OH); or oxygen atoms of a Ti—O—Ti linkage, e.g., organosiloxytitanium polymers of the unit formula OTi[OSi(CH$_3$)$_3$]$_2$ The valences in this second type of organosiloxytitanium compound can also be satisfied by a mixture of the above substituents, e.g.

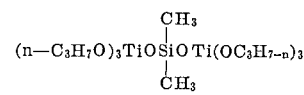

$$\text{(n—C}_3\text{H}_7\text{O)}_3\text{TiO} \overset{\text{CH}_3}{\underset{\text{CH}_3}{\text{Si}}} \text{O Ti(OC}_3\text{H}_{7-n}\text{)}_3$$

These organosiloxytitanium compounds are more fully described in U.S. Letters Patent No. 3,294,739.

Another class of curing catalyst (C) is the β-dicarbonyl titanium compounds of the formula $$\begin{bmatrix} R^3-C-O- \\ R^4-C \\ R^5-C=C \end{bmatrix}_2 TiZ_2$$

wherein R$^3$ is a monovalent hydrocarbon radical having from 1 to 18 inclusive carbon atoms, R$^4$ is a radical selected from the group consisting of monovalent hydrocarbon radicals having from 1 to 18 inclusive carbon atoms and a hydrogen atom, R$^5$ is a monovalent radical selected from the group consisting of hydrocarbon radicals and aliphatic hydrocarbonoxy radicals, each having from 1 to 18 inclusive carbon atoms, and Z is a radical selected from the group consisting of monovalent aliphatic hydrocarbonoxy radicals, monovalent acyloxy radicals, each having from 1 to 18 inclusive carbon atoms, hydroxyl radicals and divalent oxygen atoms forming a Ti—O—Ti linkage.

R$^3$ can be any monovalent hydrocarbon radical such as methyl, ethyl, propyl, isopropyl, butyl, tertiarybutyl, amyl, xylyl, sec-amyl, phenyl, hexyl, cyclohexyl, octadecyl, allyl, and hexenyl; R$^4$ can be hydrogen or any monovalent hydrocarbon radical such as the examples shown for R$^3$; R$^5$ can be any monovalent hydrocarbon radical such as the examples shown for R$^3$ or any monovalent aliphatic hydrocarbonoxy radical such as methoxy, ethoxy, isopropoxy, allyloxy, propoxy, tertiarybutoxy, hexoxy, sec-amyloxy and octadecyloxy. Z can be any monovalent aliphatic hydrocarbonoxy radical such as methoxy, ethoxy, isopropoxy, allyloxy, propoxy, tertiary butoxy, hexoxy, cyclohexoxy, sec-amyloxy, and octadecyloy; or any monovalent acyloxy radical such as CH$_3$COO—, CH$_3$CH$_2$COO—, CH$_3$(CH$_2$)$_{16}$COO—, $$\text{CH}_3\text{CH}_2\overset{\text{CH}_3}{\underset{}{\text{CH}}}\text{COO}-$$

CH$_3$(CH$_2$)$_3$CO—, CH$_3$(CH$_2$)$_{10}$COO—, and $$\text{CH}_3-\overset{\text{CH}_3}{\underset{\text{CH}_3}{\text{C}}}-\text{CH}_2\text{COO}-$$

Partial hydrolyzates of the β-dicarbonyl titanium compounds can be used. The partial hydrolyzate can be prepared by partially hydrolyzing the titanium compounds defined above. These partial hydrolyzates obtained have some of the Z groups replaced by divalent oxygen atoms and a TiOH or Ti—O—Ti linkage is formed.

Examples of the β-dicarbonyl titanium compounds are

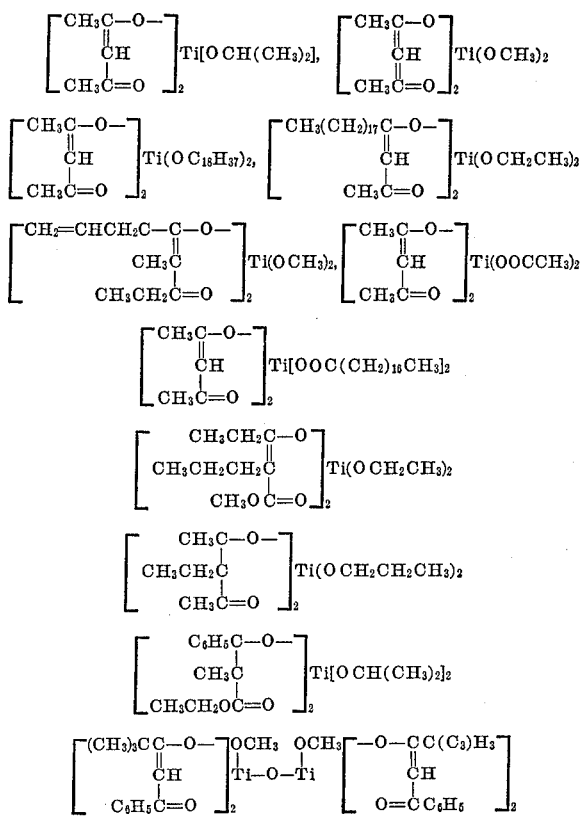

The β-dicarbonyl titanium compounds can be both monomeric and polymeric materials. They are chelated materials in which an oxygen atom is chelated with the titanium atom. In the chelate compounds, Ti can have a valence of 6 rather than just 4, and the extra valences are satisfied with the chelating oxygen atom. An example of how the chelated compounds bond can be shown by bis(acetylacetonyl)diisopropyltitanate.

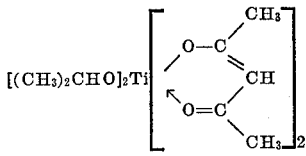

The β-dicarbonyl titanium compounds are described in greater detail in U.S. Letters Patent No. 3,334,067.

Additional suitable catalysts include amines such as hexylamine, dodecylamine, and amine salts such as hexylamineacetate, dodecylaminephosphate and a quaternary amine salt such as benzyltrimethylammoniumacetate and salts of alkali metals such as potassium acetate.

The curing catalyst (C) is preferably bis(acetylacetonyl)diisopropyltitanate, stannous carboxylates and certain orthotitanates and partial condensates thereof.

The compositions of the present invention cure upon exposure to moisture, such as atmospheric moisture without the application of heat. However, they can be stored for long periods of time, if stored in the absence of moisture. The compositions of the present invention can be heated which accelerates the rate of cure.

The compositions of the present invention are relatively stable in viscosity and can readily be squeezed from storage tubes by hand, even after long periods of storage. Other silicone systems become hard very quickly upon mixing the boron nitride and the silicone polymer and require extrusion or pressure molding to use the compositions. The compositions of the present invention are thus easily used to insulate electrical components and provide these electrical components with a thermally conductive insulation. The compositions are readily squeezed from the storage tube and can be shaped into the desired form by hand.

A thermally conductive room temperature vulcanizable silicone rubber is a silicone rubber which when cured has a thermal conductivity of at least $1.30 \times 10^{-3}$ cal./sec./cm.$^2$/° C./cm.

The compositions of the present invention preferably contain a fourth ingredient. The fourth ingredient is an alkoxysilane of the formula $$R''_a Si(OR)_{4-a}$$

wherein R and R'' are defined above and $a$ has an average value from 0 to 1 inclusive. These silanes can be single silanes or mixtures of silanes. Preferably, $a$ is 1 and R'' is methyl.

Specific examples of silanes which can be used are tetraethoxysilane, ethyltrimethoxysilane, vinyltrimethoxysilane, 3,3,3 - trifluoropropyltrimethoxysilane, β-cyanoethyltrimethoxysilane, tetraisopropoxysilane, tetrabutoxysilane, phenyltrimethoxysilane, octadecyltrimethoxysilane, tetra-(β-chloroethoxy)silane, tetra - (2,2,2 - trifluoroethoxy)silane, and propyl-tris-(delta-chlorobutoxy)silane. Other operable silanes are described in the art in such U.S. Patents as No. 2,843,555, No. 3,127,363 and No. 2,927,-907. The preferred silane is methyltrimethoxysilane.

The silanes can be presented in amounts of from 0.5 to 10 weight percent based on the weight of the organopolysiloxane (A), preferably the silanes are present in amounts of from 1 to 5 weight percent based on the weight of the organopolysiloxane (A).

The stable thermally conductive room temperature vulcanizable silicone rubbers of the present invention can be best prepared by mixing the ingredients in the absence of moisture. The method of mixing is not critical and can be hand mixing, mixing in a machine mixer, or mixing on a rubber mill, for example. The order of mixing the ingredients is not critical, however, the best results are obtained when the organopolysiloxane (A) and boron nitride are milled and thereafter mixing in the catalyst and any alkoxysilane.

Other fillers and additives can be used, but are usually not preferred.

The compositions of the present invention are particularly useful for encapsulating semiconductors. Semiconductors are quite dependent upon their electrical resistance to function properly in such circuits as television receivers and the like. Since the semiconductors should not obtain a high temperature, some means of dissipating the heat is required. The present composition both insulates the semiconductor electrically and conducts the heat away from the semiconductor, thus dissipating the heat. A copper or other metal component can be used in contact with a vulcanized composition of this invention to dissipate the heat from the cured silicone rubber of this invention.

The above utility represents only one specific use of the present invention which can be used for an electrical insulation or any other silicone rubber use in which it is desirable to conduct the heat away from a particular body.

The following examples are illustrative only and should not be construed as limiting the present invention which is properly delineated in the appended claims.

Example 1

A mixture of 100 parts by weight of trimethoxysiloxy endblocked polydimethylsiloxane having a viscosity of 3500 cs. at 25° C. and 125 parts by weight of 325 mesh boron nitride was prepared by milling. To the resulting mixture, 3 parts by weight methyltrimethoxysilane and 0.5 part by weight bis(acetylacetonyl)diisopropyltitanate was added and mixed. The above mixture remained uncured when stored for over a month in a moisture free container. The mixture was allowed to cure at room temperature for 72 hours and cured to a rubber which had a durometer (Shore A) of 64, a tensile strength of 410 p.s.i., an elongation of 105% and a specific gravity of 1.41. This rubber had a thermal conductivity of $1.43 \times 10^{-3}$ cal./sec./cm.$^2$/° C./cm.

Example 2

For purposes of comparison the following mixtures were milled:

(A)

100 parts by weight of a hydroxyl endblocked polydimethylsiloxane having a viscosity of 2000 cs. at 25° C. and
55 parts by weight of boron nitride having a minimum of 75% of the particles in 45 to 325 mesh.

(B)

100 parts by weight of a hydroxyl endblocked polydimethylsiloxane having a viscosity of 2000 cs. at 25° C. and
125 parts by weight of boron nitride having a minimum of 75% of the particles in 45 to 325 mesh.

(C)

100 parts by weight of a hydroxyl endblocked polydimethylsiloxane having a viscosity of 4000 cs. at 25° C. and
125 parts by weight of boron nitride having a minimum of 75% of the particles in 45 to 325 mesh.

(D)

100 parts by weight of a methylphenylvinylsiloxy endblocked polydimethylsiloxane having a viscosity of 400 cs. at 25° C. and
125 parts by weight of boron nitride having a minimum of 75% of the particles in 45 to 325 mesh.

(E)

100 parts by weight of a methylphenylvinylsiloxy endblocked polydimethylsiloxane having a viscosity of 400 cs. at 25° C. and
55 parts by weight of boron nitride having a minimum of 75% of the particles in 45 and 325 mesh.

(F)

100 parts by weight of a methylphenylvinylsiloxy endblocked polydimethylsiloxane having a viscosity of 2000 cs. at 25° C. and
125 parts by weight of boron nitride having a minimum of 75% of the particles in 45 to 325 mesh.

All of the above mixtures gelled immediately after removing from the mill and could not be stored or used.

Example 3

(A) Example 1 was repeated except the boron nitride had a minimum of 75% of the particles in 45 to 325 mesh. The cured rubber had a durometer (Shore A) of 61, a tensile strength of 325 p.s.i., an elongation of 95%, a specific gravity of 1.41 and a thermal conductivity of $1.65 \times 10^{-3}$ cal./sec./cm.$^2$/° C./cm. The volume resistivity of the cured rubber was $1.9 \times 10^{16}$ ohm cm., the surface resistivity was $7.0 \times 10^{16}$ ohm, the dielectric constant was 2.95 at $10^2$ hertz and 2.95 at $10^5$ hertz, and the dissipation factor was 0.0040 at $10^2$ hertz and 0.00020 at $10^5$ hertz.

(B) Example 1 was repeated except 150 parts by weight of boron nitride of (A) above was used. The cured rubber had a durometer (Shore A) of 64, a tensile strength of 375 p.s.i., an elongation of 90%, a specific gravity of 1.49 and a thermal conductivity of $1.39 \times 10^{-3}$ cal./sec./cm.$^2$/° C./cm.

(C) Example 1 was repeated except the boron nitride was a mixture of 50 parts by weight of the boron nitride of (A) above and 50 parts by weight of boron nitride having an average particle size of 15 micron (~325 mesh). The cured rubber had a durometer (Shore A) of 52, a tensile strength of 240 p.s.i., an elongation of 125%, a specific gravity of 1.43, and a thermal conductivity of $1.45 \times 10^{-3}$ cal./sec./cm.$^2$/° C./cm. The volume resistivity of the cured rubber was $5.5 \times 10^{15}$ ohm cm., the surface resistivity was $2.8 \times 10^{15}$ ohm, the dielectric constant was 3.19 at $10^2$ hertz and 3.17 at $10^5$ hertz, and the dissipation factor was 0.00108 at $10^2$ hertz and 0.00039 at $10^5$ hertz.

Example 4

The following mixtures are curable but stable when stored in the absence of moisture and when cured provide a thermally conductive insulation when prepared as described in Example 1.

(A)

100 parts by weight of a polymer of the average formula
$(CH_3O)_3SiO[(CH_3)_2SiO]_{297}Si(OCH_3)_3$,
110 parts by weight of a finely divided boron nitride, and
0.1 part by weight di-n-hexylamine.

(B)

100 parts by weight of a polymer of the average formula $(CH_3O)_3Si[(CH_3)_2SiO]_{297}Si(OCH_3)_3$,
110 parts by weight of a finely divided boron nitride,
1 part by weight vinyltriethoxysilane, and
0.1 part by weight di-n-hexylamine.

(C)

100 parts by weight of a trimethoxysiloxy endblocked polydimethylsiloxane having a viscosity of 12,000 cs. at 25° C.,
40 parts by weight of a trimethylsiloxy endblocked polydimethylsiloxane as a plasticizer,
28 parts by weight of a trimethylsiloxy coated finely-divided silica having a surface area of about 350 square meters per gram,
175 parts by weight of a finely divided boron nitride
5 parts by weight methyltrimethoxysilane, and
1 part by weight bis(acetylacetonyl)diisopropyltitanate.

(D)

100 parts by weight of a trimethoxysiloxy endblocked polydimethylsiloxane having a viscosity of 2000 cs. at 25° C.,
120 parts by weight of a finely divided boron nitride,
5 parts by weight of vinyltrimethoxysilane, and
1 part by weight

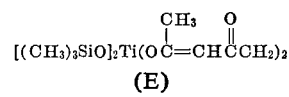

(E)

100 parts by weight of a polymer of the average formula

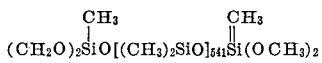

130 parts by weight of a finely divided boron nitride, and
0.3 part by weight di-n-hexylamine.

(F)

100 parts by weight of a methyldimethoxysiloxy endblocked polydimethylsiloxane having a viscosity of 57 cs. at 25° C.,
45.1 parts by weight of methyltrimethoxysilane,
175 parts by weight of a finely divided boron nitride, and
0.784 part by weight of

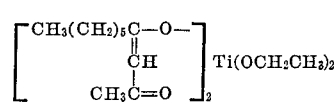

(G)

100 parts by weight of a polymer of the average formula

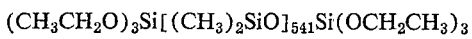

150 parts by weight of a finely divided boron nitride, and
2 parts by weight dibutyl tin dilaurate.

(H)

100 parts by weight of a trimethoxysiloxy endblocked poly-3,3,3-trifluoropropylmethylsiloxane having a viscosity of 300 cs. at 25° C.
140 parts by weight of a finely divided boron nitride,
7.5 parts by weight of methyltrimethoxysilane,
2.5 parts by weight of

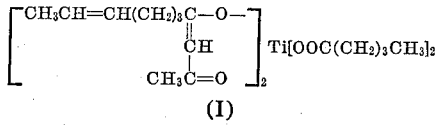

(I)

100 parts by weight of a polymer of the average formula

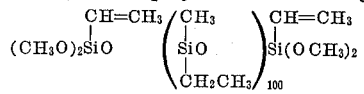

160 parts by weight of a finely divided boron nitride,
0.5 part by weight $C_6H_{11}Si(OCH_3)_3$
2 parts by weight $$[(CH_3)_3SiO]_2Ti[OCH(CH_3)_2]_2$$

(J)

100 parts by weight of a polymer of the average formula

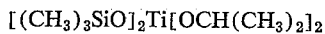

170 parts by weight of a finely divided boron nitride,
10 parts by weight of $C_3H_7Si(OC_3H_7)_3$, and
10 parts by weight of bis-(acetylacetonyl)diisopropyltitanate.

Example 5

When Example 1 is repeated and the following polymers replace the trimethoxysiloxy endblocked polydimethylsiloxane, a silicone composition is obtained which can be stored in the absence of moisture but cures to a rubber when exposed to moisture at room temperature and which cures to a thermally conductive silicone rubber.

(A)

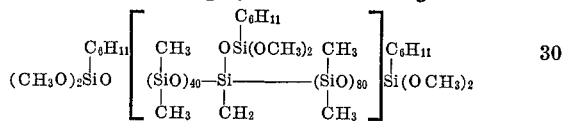

(B)    $(CH_3O)_2SiO\underset{\underset{}{}}{\overset{CH_2CH(CH_3)_2}{|}}\text{————}\underset{\underset{}{}}{\overset{C_{18}H_{37}}{|}}(CH_3SiO)_{20}\text{—}\underset{\underset{}{}}{\overset{CH_2CH(CH_2)_2}{|}}Si(OCH_3)_2$ (C)    $(CH_3O)_2SiO\text{—}[(CH_3)_2SO]_{1250}\underset{}{\overset{CH_2CH_2CF_3}{|}\phantom{xx}\overset{CH_2CH_2CF_2}{|}}Si(OCH_2)_2$ (D)    $(CH_3O)_2SiO[(CH_3CH_2CH_2)(CH_3)SiO]_{20}\overset{CH_3}{\underset{}{|}}\phantom{x}\overset{CH_3}{\underset{}{|}}Si(OCH_3)_2$ (E)

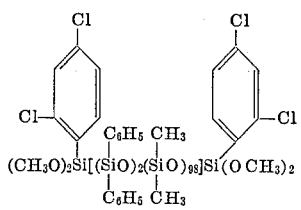

(F)    $(C_3H_7O)_3SiO[(C_6H_5)(CH_3)SiO]_7Si(OC_3H_7)_3$ (G)    $(CH_3O_2SiO([NCCH_2CH_2)(CH_3)SiO]_{100}SiO(CH_3)_2$ (H)    $([CH_3CH_2)_2CHCH_2O]_3SiO[(CH_3)_2SiO]_{498}Si[OCH_2CH(CH_2CH_3)_2]_2$ (I) A tri(delta-chlorobutoxy)siloxy endblocked polydimethylsiloxane having a viscosity of 2,000 cs. at 25° C.

Example 6

When Example 1 is repeated and the following silanes replace the methyltrimethoxysilane, a silicone composition is obtained which can be stored in the absence of moisture but cures to a rubber when exposed to moisture at room temperature and which cures to a thermally conductive silicone rubber.

(A)    $C_6H_5Si(OCH_3)_3$ (B)    $CF_3CH_2CH_2Si(OCH_2CF_3)_3$ (C)    $CH_3Si(OCH_2CH_2CH_2Cl)_3$ (D)    $C_{18}H_{37}Si(O\overset{CH_3}{\underset{}{|}}CHCH_2Cl)_3$ (E)    $CH_3Si(OCH_2CH_2CH_2CH_2Br)_3$ (F)    $Si(OCH_2CH_3)_4$ (G)    $Si(OCH_2CH_2CH_3)_4$ That which is claimed is:
1. A stable thermally conductive composition under anhydrous conditions and curable by exposure to moisture consisting essentially of:
(A) 100 parts by weight of an organopolysiloxane of the formula

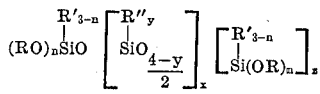

in which R is a monovalent radical of from 1 to 8 inclusive carbon atoms selected from the group consisting of aliphatic hydrocarbon radicals and halogenated aliphatic hydrocarbon radicals, each R' and R" is selected from the group consisting of monovalent hydrocarbon radicals, monovalent halogenated hydrocarbon radicals and cyanoalkyl radicals, all of from 1 to 18 inclusive carbon atoms, n has an average value of from 2 to 3 inclusive, y has an average value of from 1.99 to 2 inclusive, z has an average value of from 1 to 1.01, the sum of y+z is 3 and x has an average value of from 7 to 1250,
(B) from 110 to 175 parts by weight of finely divided boron nitride, and
(C) a curing catalyst for the organopolysiloxane (A).
2. The composition in accordance with claim 1 in which 0.5 to 10 weight percent of an alkoxysilane of the formula

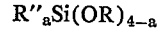

wherein R and R" are defined above and $a$ has an average value from 0 to 1 inclusive, based on the weight of the organopolysiloxane (A) is present.
3. The composition in accordance with claim 1 in which R and R" are both monovalent hydrocarbon radicals, n is 3 and x has an average value of from 100 to 500 inclusive.
4. The composition in accordance with claim 2 in which R and R" are both monovalent hydrocarbon radicals, n is 3 and x has an average value of from 100 to 500 inclusive.
5. The composition in accordance with claim 3 in which R and R" are both methyl radicals.
6. The composition in accordance with claim 4 in which R and R" are both methyl radicals.
7. The composition in accordance with claim 1 in which (B) is present in amounts of from 125 to 150 inclusive.
8. The composition in accordance with claim 2 in which (B) is present in amounts of from 125 to 150 inclusive.
9. The composition in accordance with claim 6 in which (B) is present in amounts of from 125 to 150 inclusive.
10. The composition in accordance with claim 1 in which (C) is present in amounts of from 0.1 to 10 weight percent based on the weight of the organopolysiloxane (A).

11. The composition in accordance with claim 2 in which (C) is present in amounts of from 0.1 to 10 weight percent based on the weight of the organopolysiloxane (A).

12. The composition in accordance with claim 9 in which (C) is present in amounts of from 0.1 to 10 weight percent based on the weight of the organopolysiloxane (A).

13. The composition in accordance with claim 10 in which (C) is present in amounts of from 0.1 to 2 weight percent.

14. The composition in accordance with claim 11 in which (C) is present in amounts of from 0.1 to 2 weight percent.

15. The composition in accordance with claim 12 in which (C) is present in amounts of from 0.1 to 2 weight percent.

16. The composition in accordance with claim 1 in which the catalyst (C) is bis(acetylacetonyl)diisopropyltitanate.

17. The composition in accordance with claim 2 in which the catalyst (C) is bis(acetylacetonyl)diisopropyltitanate.

18. The composition in accordance with claim 4 in which the catalyst (C) is bis(acetylacetonyl)diisopropyltitanate.

19. The composition in accordance with claim 9 in which the catalyst (C) is bis(acetylacetonyl)diisopropyltitanate.

20. The composition in accordance with claim 11 in which the catalyst (C) is bis(acetylacetonyl)diisopropyltitanate.

21. The composition in accordance with claim 15 in which the catalyst (C) is bis(acetylacetonyl)diisopropyltitanate.

References Cited

UNITED STATES PATENTS

| | | | |
|---|---|---|---|
| 3,161,614 | 12/1964 | Brown et al. | 260—46.5 |
| 3,215,662 | 11/1965 | Clark | 260—37 |
| 3,294,739 | 12/1966 | Weyenberg | 260—46.5 |
| 3,334,067 | 8/1967 | Weyenberg | 260—46.5 |
| 3,127,363 | 3/1964 | Nitzsche et al. | 260—18 |

FOREIGN PATENTS 1,097,134  1/1961  Germany.

DONALD E. CZAJA, Primary Examiner

M. I. MARQUIS, Assistant Examiner

U.S. Cl. X.R.

117—135.1, 161; 252—63.7; 260—18, 45.9, 46.5